April 24, 1956   L. CLARKE   2,743,047
PROCESS OF AND APPARATUS FOR THE FILLING OF CONTAINERS
Filed Nov. 6, 1952   2 Sheets-Sheet 2
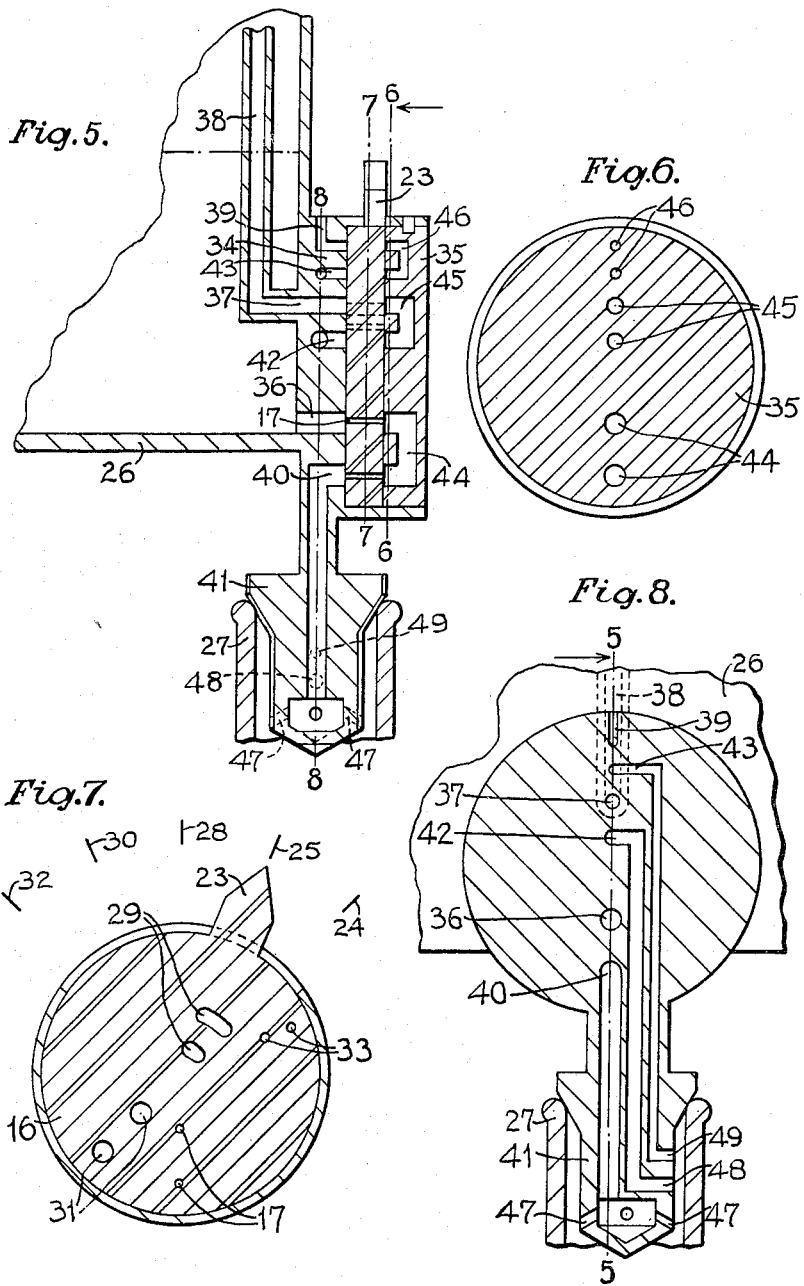
Inventor
*Leslie Clarke*
By
Ferdinand Broster Bosshardt
Attorney United States Patent Office 2,743,047
Patented Apr. 24, 1956

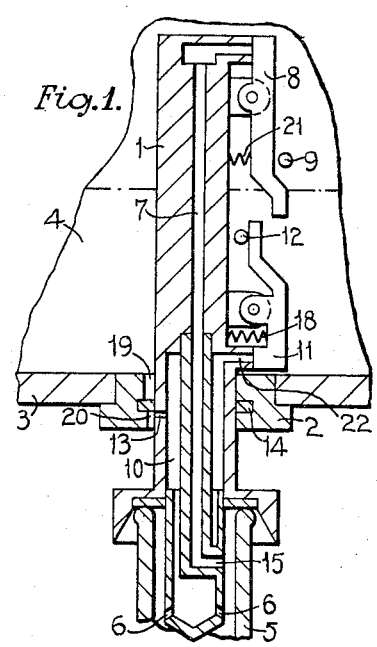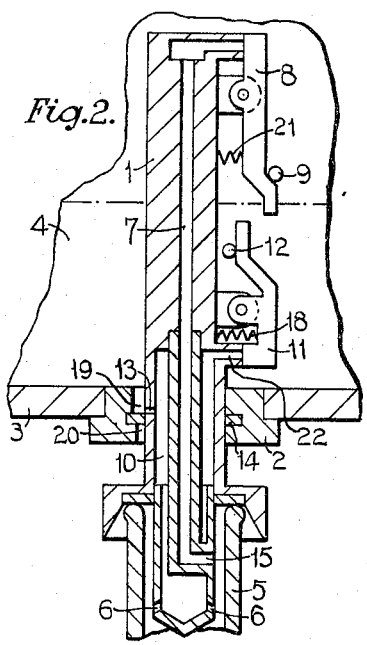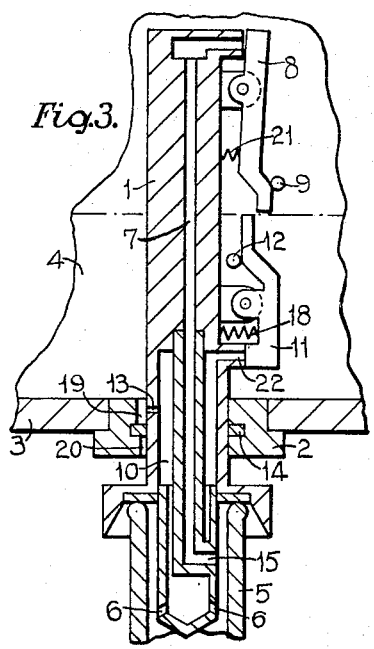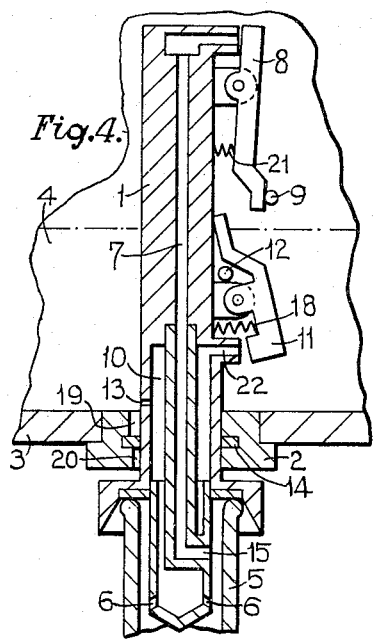

2,743,047
PROCESS OF AND APPARATUS FOR THE FILLING OF CONTAINERS

Leslie Clarke, Heaton Mersey, Stockport, England, assignor of one-half to Bratby & Hinchliffe Limited, Manchester, England Application November 6, 1952, Serial No. 319,147

Claims priority, application Great Britain July 7, 1952

14 Claims. (Cl. 226—115)

This invention relates to the filling of containers, such as bottles with flavouring liquid, such as a syrup, and water charged with a gas, such as carbon dioxide gas whilst the pressure in the container is about equal to that in a vessel from which the gas charged water flows into the container.

Hitherto there was a considerable lack of uniformity in the quantity of gas contained in the water present in the container after filling with the result that the liquid level in the containers was not uniform and the beverage in the containers was not of uniformly good quality or condition.

A process of filling containers with a flavouring liquid and gas charged water in accordance with the said invention includes the introduction into the container of water in a slow gentle way to form a covering of water or diluted flavouring liquid over the preinserted flavouring liquid before the container is filled up with gas charged water at a speed which is faster than the speed of introduction of the covering of water.

The covering water may be introduced before or after the interior of the container has been subjected to a pressure above atmospheric pressure.

The covering water may be gas charged water or water not charged with gas.

The introduction of the covering water into the container may be effected at any time between the placing of the flavouring liquid in the container and the subsequent filling up of the container with gas charged water whilst the interior of the container is subjected to a counterpressure in known manner.

The covering water is preferably introduced into the container at a slow speed so as to fall gently onto the inside surface thereof and thereupon flow down the said surface gently onto the surface of the flavouring liquid so as to form a buffer or shield covering or layer thereon which interferes with such mixing of the gas charged filling water with the flavouring liquid when the said filling water is introduced at a faster speed, as would cause the flavouring liquid to make the water discharge an undesirably large quantity of its gas on being exposed to atmospheric pressure prior to sealing of the container.

The covering water may be introduced by an apparatus forming a part of or separate from a syrup inserting machine or forming a part of a counterpressure machine for filling up the container with gas charged water or by a part or parts of the said counterpressure machine constructed or modified to introduce the said water at the appropriate time in the filling operation.

An apparatus, part or parts for introducing the covering water into the container has a passage connected to a supply of water and controlled by a control device whereby a flow of covering water can be passed into the container containing the flavouring liquid, but only at a slow rate which leaves the water without sufficient force to penetrate into and mix with the mass of flavouring liquid to a substantial extent.

The said passage may be controlled by a valve or by constriction or obstruction or any other suitable means which enables the flow to be started and stopped and may or may not also ensure the low rate of flow required to obtain the buffer or shield layer or covering of water above the flavouring liquid.

The said valve may be a plug valve, a disc valve, a bleed poppet valve or any other suitable kind of valve.

The passage may be of such small diameter that when fully open, it allows the passage of the covering water through it, even whilst driven by pressure, to be at only a slow speed to avoid the creation of turbulence in the flavouring liquid when it meets the said liquid.

In one form of device, a small hole is provided in a slidable part of a counterpressure bottle filler and in one position of the filler establishes communication between the inside of the bottle and the gas charged water in the filler tank for the introduction of gas charged covering water over the flavouring liquid prior to the establishment of a larger avenue of communication, whilst in another position it is incapable of establishing the said communication, the said part being caused to slide into the first named position for a period before gas charged filling water is introduced from the tank into the bottle through the larger avenue of communication in the said part to fill up the bottle and to slide into and remain in the second named position before and after the introduction of the gas charged filling water through the larger avenue of communication.

The movements of the said part may be controlled by a cam.

The movement of the said part into the first named position is preferably effected before the usual communication between the bottle and the gas in the tank is established, but may be effected after the said communication has been established.

In an alternative form of device, a small port may be provided in a disc or plug valve of a counterpressure filling machine, in addition to the usual ports for establishing communication of the gas and the gas charged water in the tank and of atmosphere with the bottle at the proper periods, the said small port permitting a flow of water from the tank at a slow rate for covering the flavouring liquid before the usual ports are brought into operation.

In the accompanying drawings, which illustrate diagrammatically two constructions of novel apparatus with the aid of which the process can be performed—

Figures 1 to 4 show front views in section of a part of a counterpressure bottle filling machine with a filling head, the filling head and some of its working parts being shown in different positions in the various views.

Figure 5 shows a side view in section taken on a line corresponding with line 5—5 of Figure 8, of a part of a filling machine with a filling head of another construction.

Figure 6 is a detached front view in section taken on a line corresponding with line 6—6 of Figure 5.

Figure 7 is a detached front view in section taken on a line corresponding with line 7—7 of Figure 5.

Figure 8 is a detached front view in section taken on a line corresponding with line 8—8 of Figure 5.

Referring to the drawings, in the construction shown in Figures 1 to 4, a filling head of a counterpressure bottle filling machine has a member 1 slidably mounted in a boss 2 on the bottom of a closed tank 3 containing gas charged water 4 above which is gas at pressure. 5 is a portion of a bottle applied to the head for filling after it has received a charge of flavouring syrup in a syruping machine and been placed on a platform (not shown) whereby it can be raised by the action of a cam (not shown) so as to have its upper end pressed against the member 1 and then be caused to push the member 1 upwards in stages. The member 1 has outlets 6 fed by an annular passage 10 opening into the gas charged water 4 and controlled by a valve 11 operated by a spring 18 and controlled by a stop 12. An aperture 13 of small size, for example forty-thousandths of an inch in diameter where the gas charged water is at a pressure of about 55 lbs. per square inch, connects the passage 10 to the exterior of the member 1. The boss is provided with a sealing ring 14 in which the member 1 is slidable. The gas charged water has freedom to flow down the interior of the boss 2 to the ring 14, for example by providing for the purpose clearance between the boss and the member 1, and/or, as shown providing a passage 19 in the boss 2. Therefore when the aperture 13 is above the ring 14, as shown in Figure 2, the gas charged water can flow freely to and through the aperture 13 and through the passage 10 and outlets 6 into the bottle, whereas when the aperture 13 is below the ring, 14, as shown in Figure 1, the aperture 13 is shut off from the said water by the ring 14, but is open to atmosphere, for example because of clearance provided for the purpose between the boss and the member 1, and/or, as shown because of a passage 20 provided for the purpose in the boss below the ring 14. The member 1 has also an outlet 15 connected to a central passage 7 opening into the gas and controlled by a valve 8 opened by a stop 9 and closed by a spring 21.

When the bottle 5 containing a charge of syrup at the bottom is placed on the platform, both of the valves 8 and 11 are in the shut position and the aperture 13 is below the ring 14, all as shown in Figure 1. The cam has a lift which operates to raise the bottle until it and the member 1 are in the position shown in Figure 2, the valves 8 and 11 then still being closed but the aperture 13 being above the ring 14, as shown in that figure. Consequently gas charged water under pressure can be and is forced to and through the aperture 13 and the passage 10 and outlets 6 into the interior of the bottle which is at atmospheric pressure. However due to the smallness of the aperture 13, the rate of flow of the water through the outlets 6 is slower than the rate of flow at which gas charged water was hitherto filled into the bottle so that the water flows gently on to and down the wall of the bottle to arrive at and settle on the surface of the syrup, which is of greater specific gravity and viscosity than said water, and only a relatively small amount of mixing of the water with the syrup occurs and a covering or layer of the said water or of the said water containing only a small amount of syrup is produced on top of the charge of syrup. There is a further lift on the cam which then further raises the member 1. The lift raises the member 1 to the position shown in Figure 3 and therefore the valve 8 has been opened by the stop 9, as shown in Figure 3, against the action of the spring 21, and thereby allows gas to flow through the passage 7 and outlet 15 into the bottle 5 so as to set up in the bottle a counterpressure about equal to the pressure in the tank 3. From that position the member continues to be raised until it reaches the position shown in Figure 4 in which the valve 8 is retained open by the stop 9 whilst the stop 12 has ceased to hold the valve 11 closed against the pressure of the spring 18 and therefore the spring 18, in the absence of a higher pressure in the tank 3 than in the bottle 5 has forced the valve into its open position, as shown in Figure 4. The gas charged water 4 is therefore then free to flow through a passage 22 opened by the valve 11 into the bottle via the passage 10 and outlets 6. The size of the passage 22 opened by the valve 11 is much greater than the size of the aperture 13, and therefore the flow of gas charged water through the passage 22 into the bottle takes place at a much higher rate than did the flow through the aperture 13, notwithstanding the absence of the pressure difference which existed during the flow through aperture 13. The bottle is therefore quickly filled up with gas charged water but the water entering via the passage 22 controlled by the valve 11 is prevented from striking forcibly and penetrating into the syrup by the buffer or shield layer or covering of water supplied before by the passage 13 and therefore already present above the syrup before the filling at a quicker rate with gas charged water commenced. This use of a covering or layer of water introduced without creating substantial turbulence in the syrup in order to prevent gas charged water subsequently introduced at a faster rate from creating turbulence in the syrup and thereby causing mixing of the syrup with the water to an extent which detrimentally affects the capacity of the water to retain its charge of gas, is the essence of the said invention.

The protection afforded by the layer or covering of water is so great that it is possible to use a higher rate of introduction of the major portion of the gas charged water into the bottle than has previously been considered possible without excessive loss of gas, in order to compensate for the slower filling rate of the buffer or shield water, and therefore an improved efficiency without loss in output is obtainable.

The cam has a descent which allows the member 1 to sink after the bottle has been filled up to the desired level, the sinking of the member 1 resulting in the stop 9 allowing the valve 8 to close with the aid of the spring 21 and the stop 12 closing the valve 11 against the action of the spring 18 so as to shut off both the gas charged water and the gas in the tank 3 from the bottle. The descent of member 1 also causes the aperture 13 to pass from above the ring 14 to below the same where it communicates with atmosphere and thus allows the escape of gas from the bottle into atmosphere so as to reduce the pressure to atmospheric pressure before the cam allows the bottle to descend and break its seal with the member 1. The parts are then again in the position shown in Figure 1.

As heretofore, the member 1 is urged upwards by the cam against the action of springs (not shown) which then act to urge the member 1 downwards when permitted by the cam.

Because each bottle receives the hereinbefore described covering or layer of water above its charge of syrup before further water is introduced, and therefore mixing of the syrup with the water to an extent which would cause discharge of a substantial amount of gas from the water before the sealing of the bottle can be effected to prevent such discharge, each bottle can be relied on to contain a substantially uniform quantity of gas sufficient to make the beverage of good quality so far as its effervescent property is concerned. The invention therefore enables bottles to be filled with a greater certainty of uniformity of quality and liquid level than hitherto.

In the construction illustrated in Figures 5 to 8, which is applicable to a filling machine in which the flow of gas charged water and gas and the pressure release from a bottle 27, Figures 5 and 8, are controlled by means of a plug or disc valve 16, Figures 5 and 7, adapted to be rotated by a cam or other convenient means (not shown) and forming a part of a filling head in known manner, the plug or disc valve is furnished with additional ports 17 of sufficiently small diameter to ensure a slow flow of gas charged water under pressure therethrough and the cam or other means is adapted, after the application of a syrup charged bottle to the filling head, to rotate the valve from its closed position in which an arm 23 on the valve occupies the position indicated by the mark 24 of Figure 7 into the shown position in which the arm 23 occupies the position indicated by the mark 25, in which the ports 17 are open to the gas charged water contained in the closed tank 26, Figures 5 and 8, of the filling machine so that water can flow at a slow rate into the bottle 27 to form the protective covering or layer over the syrup, whereupon the cam or other means moves the valve 16 into the previously known position in which the arm 23 occupies the position indicated by the mark 28 and the bottle is connected to the gas in the tank by ports 29, then into the previously known position in which the arm 23 occupies the position indicated by the mark 30 and the gas charged water can flow through ports 31 of larger size than the ports 17 into the bottle 27 for quick filling up and finally into the position where the arm 23 occupies the position indicated by the mark 32 and the gas and gas charged water are shut off from the bottle 27 entirely but the interior of the bottle is connected by ports 33 to atmosphere before removal of the filled bottle, after which the valve is returned to the position in which the arm 23 again occupies the position indicated by the mark 24.

The valve 16 is contained in a casing composed of a part 34 and a part 35. The part 34 has a passage 36 for the gas charged water to flow from the tank 26 to the valve 16. It also has a port 37 through which the gas can flow to the valve 16 after passing down a pipe 38 in the tank 26. The part 34 also has a port 39 through which air freed by the valve 16 can escape to atmosphere. It furthermore has a port 40 through which the gas charged water can flow into a plug 41 forming part of the filling head and having the bottle 27 pushed on to it. The part 34 also has a port 42 for supplying the plug with gas under pressure and a port 43 for allowing air to escape from the bottle via the plug 41.

The part 35 has a port 44 registering with the ports 36 and 40, a port 45 registering with the ports 37 and 42 and a port 46 registering with the ports 39 and 43. The covering water and the filling water pass into the bottle through passages 47 provided in the plug 41 and directing the water on to the inner surface of the bottle. The gas under pressure passes into the bottle through the passage 48 in the plug and the escape of air takes place through the passage 49 in the said plug.

Other known forms of bottle filling machines can be modified to produce a predetermined calculated introduction of covering water at a slower rate than the normal filling rate and to thereupon fill at a quicker rate than the said normal filling rate, or a syruping machine may be modified or adapted to supply the said covering water at a slow rate before the bottle is passed on to a charged gas water filling machine operating with counterpressure, or an entirely separate machine from the syruping machine and said filling machine can be provided to which the bottles are submitted for the reception of the covering water between their submission to the syruping machine and the said filling machine. In still another form of machine, a filling machine of substantially known form may be provided with an additional tank to supply covering water after the bottle has been fed to the filling machine but before the filling machine commences to subject the interior of the bottle to a counterpressure and to fill up the bottle with gas charged water.

It will also be appreciated that the covering water can be introduced into the bottle after the counter-pressure has been built up therein instead of before the said counter-pressure is created.

I claim:

1. A process of filling containers with a flavouring liquid and gas charged water including the introduction of a flavouring liquid into the container, then the introduction of covering water into the container in a slow gentle way before the interior of the container has been subjected to a pressure above atmospheric pressure to form a covering of liquid over the preinserted flavouring liquid, then the subjection of the interior of the container to a pressure above atmospheric pressure and thereupon the filling up of the container with gas charged water at a speed which is faster than the speed of introduction of the covering water.

2. In means for filling containers with gas charged liquid after the introduction of a flavouring substance into the container, a counterpressure filler, a filler tank under pressure and forming a part of the said filler, means for creating a counterpressure in the container prior to filling with gas charged liquid and means for gently passing covering liquid from the tank into the container before the means for creating a counterpressure in the container are made operative.

3. In means for introducing covering liquid into a container to form a covering for a flavouring liquid in the container, means for subjecting the interior of the container intermittently to a pressure above atmospheric pressure, a water conducting passage for conducting water to the container at a slow rate into the interior of the container before operation of the means for subjecting the interior of the container to a pressure above atmospheric pressure, and means for controlling the occurrence of flow of covering liquid through the said passage.

4. Means for introducing covering liquid into a container to form a covering over a flavouring liquid in the container, the said means having a mechanism for introducing a counterpressure into the container, a passage for feeding covering liquid, a constriction for limiting the rate of the passage of covering liquid into the container to a slow rate which supplies covering liquid lacking in penetrative force and therefore not substantially penetrating and mixing with the already contained flavouring liquid and means for starting the supply of covering liquid through the constriction before the said mechanism introduces counterpressure into the container.

5. Means for introducing covering liquid into a container to form a covering between the insertion of a flavouring liquid into the container and the subjection of the container to a counterpressure, the said means comprising mechanism for introducing counterpressure into the container after introduction of covering liquid, a passage connected to a supply of covering liquid, and a valve for limiting the rate of the passage of covering liquid from the supply into the container already containing flavouring liquid, to a slow rate which supplies covering liquid lacking in penetrative force and therefore not substantially penetrating and mixing with the already present flavouring liquid in the container.

6. Means for introducing covering liquid into a container for forming a covering over a flavouring liquid in the container, the said means comprising a passage connected to a supply of covering liquid and an obstruction for limiting the rate of the passage of covering liquid from the supply into the container already containing flavouring liquid to a slow rate, in combination with means for subjecting the interior of the container to a counterpressure and means for releasing covering liquid into the container before operation of the said means for subjecting the interior of the container to a counterpressure.

7. Means for introducing covering liquid into a container for covering a flavouring liquid already present in the container, the said means having a passage connected to a supply of covering liquid and of such small cross-sectional area that covering liquid can pass therethrough only at a slow speed even when driven by pressure for avoiding the creation of turbulence in the flavouring liquid when it meets the flavouring liquid, in combination with control means for stopping the flow of covering liquid through the said passage until the passage of liquid through the said passage is desired, and with means raising the pressure in the container after covering liquid has been introduced thereinto.

8. A device for filling a container with gas charged water after flavouring liquid has been introduced into the container, comprising a counterpressure filler, a filler tank thereon, a slidable part on the filler tank, a small aperture in the slidable part, said aperture in a predetermined position of the sliding part establishing communication between the inside of a contianer and gas charged water in the filler tank for introducing gas charged covering water over flavouring liquid preintroduced into the container prior to the application of counterpressure to the container and prior to the establishment of a larger avenue of communication, the said aperture in another position of the sliding part being prevented from establishing the said communication, and the said part being slidable into the first named position for a period the container is subjected to the counterpressure and before gas charged filling water in introduced from the tank into the container through the larger avenue of communication to fill up the container and to slide into and remain in the second named position after the introduction of gas charged filling water through the larger avenue of communication.

9. In means for filling containers with liquid, a counterpressure filling machine, a tank forming a part of the machine, a valve forming a part of the said machine, a small port in the valve for establishing a small communication between gas charged liquid in the tank and the container for allowing a quiet flow of gas charged liquid in the tank, a larger port in the valve for subsequently establishing a larger communication between the said gas charged liquid and the container, and means for delaying the creation of counterpressure in the container until after the small port has established the said communication.

10. Means for filling containers with gas charged liquid, comprising a counterpressure filler, a filler tank forming a part of the said filler, a slidable part on the filler tank for the transference of gas and liquid from the tank to a container, a small aperture in the slidable part for supplying a thin stream of liquid from the filler tank for the gentle introduction of liquid from the tank into the bottle for covering preintroduced flavouring liquid prior to subjection of the container to counterpressure, and a valve controlled passage in the slidable part for supplying a thicker stream of liquid from the filler tank for filling up the container.

11. A process of filling containers with a flavouring liquid and gas charged water, including the subjection of a supply of gas charged water to a super atmospheric pressure and subjection of the container to a lower pressure than the super atmospheric pressure, then whilst the container is subjected to a lower pressure, the introduction of a flavouring liquid into the container, then, whilst the container is subjected to a lower pressure, the introduction of a thin stream of covering water into the container, then the subjection of the container to substantially the same internal pressure as that to which the supply of gas charged water is subjected and the introduction of gas charged water in a thicker stream.

12. A process of filling containers with a flavouring liquid and gas charged water, including the subjection of a supply of gas charged water to a super atmospheric pressure and subjection of the container to a lower pressure than the super atmospheric pressure, then, whilst the container is subjected to a lower pressure, the introduction of a flavouring liquid into the container, then, whilst the container is subjected to a lower pressure, the introduction of a thin stream of covering water into the container, then the subjection of the container to substantially the same internal pressure as that to which the supply of gas charged water is subjected and the introduction of gas charged water in a thicker stream.

13. A process of filling containers with a flavouring liquid and gas charged water, including the introduction of a flavouring liquid into the container, then the introduction of gas charged covering water into the container in a slow gentle way before the interior of the container has been subjected to a pressure above atmospheric pressure to form a covering of gas charged water over the preinserted flavouring liquid, the subjection of the interior of the container to a pressure above atmospheric pressure and thereupon the filling up of the container with gas charged water at a speed which is faster than the speed of introduction of the gas charged covering water.

14. Means for filling up containers with gas charged water after the introduction of flavouring liquid into the containers, comprising in combination, a counterpressure filling machine, a closed tank forming a part of the machine for containing gas charged water under constant super atmospheric pressure, a movable member forming a part of the said machine, a small aperture in the movable member for supplying covering water to the container, means for opening and closing the said aperture to the supply, a passage in the said member, the passage being larger than the aperture and supplying filling up water to the container, means for opening and closing the said passage independently of the small aperture, means for preventing the transference of the super atmospheric pressure to the interior of the bottle until the covering water has been supplied, and means for causing the transference of the constant super atmospheric pressure to the interior of the container after the covering water has been introduced.

References Cited in the file of this patent
UNITED STATES PATENTS 2,239,364     Kantor _____ Apr. 22, 1941